United States Patent
Schulz et al.

(10) Patent No.: US 6,763,622 B2
(45) Date of Patent: Jul. 20, 2004

(54) AMPLITUDE DETECTION METHOD AND APPARATUS FOR HIGH FREQUENCY IMPEDANCE TRACKING SENSORLESS ALGORITHM

(75) Inventors: Steven E. Schulz, Redondo Beach, CA (US); Nitinkumar R. Patel, Cypress, CA (US)

(73) Assignee: General Motors Corporation, Detroit, MI (US)

( * ) Notice: Subject to any disclaimer, the term of this patent is extended or adjusted under 35 U.S.C. 154(b) by 92 days.

(21) Appl. No.: 10/268,507

(22) Filed: Oct. 10, 2002

(65) Prior Publication Data

US 2004/0070360 A1 Apr. 15, 2004

(51) Int. Cl.[7] .................................................. H02P 1/46
(52) U.S. Cl. ........................ 38/700; 318/801; 318/606; 318/802; 318/807; 318/503
(58) Field of Search ................................ 318/801, 606, 318/700, 802, 807, 503

(56) References Cited

U.S. PATENT DOCUMENTS 6,601,011 B1 * 7/2003 Miyamoto et al. .......... 702/147

* cited by examiner

*Primary Examiner*—Karen Masih
(74) *Attorney, Agent, or Firm*—Christopher DeVries

(57) ABSTRACT

A control system for an electric motor including an inverter for providing power to the electric motor, a controller for controlling the inverter, a first motor speed control block in the controller injecting a high frequency signal into the electric motor to determine the speed and position of the electric motor, where the first motor speed control block includes a tuned moving average filter to determine the magnitude of high frequency current in the electric motor.

18 Claims, 3 Drawing Sheets

US 6,763,622 B2

AMPLITUDE DETECTION METHOD AND APPARATUS FOR HIGH FREQUENCY IMPEDANCE TRACKING SENSORLESS ALGORITHM

TECHNICAL FIELD

The present invention relates to the control of electric motors. More specifically, the present invention relates to a method and apparatus for position sensorless control of an electric motor.

BACKGROUND OF THE INVENTION

Traditional motor control systems normally include a feedback device or position sensor such as a resolver or encoder to provide speed and position information for a motor. Feedback devices and associated interface circuits increase the costs of a motor control system, and these costs may become prohibitive in high volume applications such as automotive applications. Additionally, a position sensor and its associated wiring harness increase the complexity and assembly time of an electric drive system in a vehicle.

Electric vehicles powered by fuel cells, batteries and hybrid systems that include electric motors are becoming more common in the automotive market. As production volumes for electric vehicles increase, the cost of feedback devices and associated interface circuits will become significant. Automakers are under intense market pressure to cut costs and reduce the number of parts for a vehicle. The removal of a feedback device for an electric motor control system will lead to significant cost reductions for an electric vehicle.

Hybrid electric and electric vehicles today utilize numerous electric motor control technologies such as the vector control of electric motors. A vector motor control scheme is a computationally intensive motor control scheme that maps the phase voltages/currents of a three-phase motor into a two axis coordinate system (D and Q axes). The structure used to excite an electric motor using a vector control scheme is a typical three phase power source inverter including six power transistors that shape the output voltage to an electric motor. Vector control requires rotor position information, which is normally obtained via a feedback device or position sensor. The objective of the position sensorless control is to obtain the rotor position information utilizing electromagnetic characteristics of an AC machine, eliminating the position sensor and its associated interface circuits.

SUMMARY OF THE INVENTION

The present invention is a method and apparatus for a sensorless motor control system used in electric and hybrid electric vehicle powertrain applications. The motor control system of the present invention calculates the current components on the $d_m$ and $q_m$ measurement axes used in the rotor position estimator using a moving average filter that improves execution time and allows relatively high bandwidth and improved transient response of the motor control system.

DESCRIPTION OF THE PREFERRED EMBODIMENT

Figure 1:
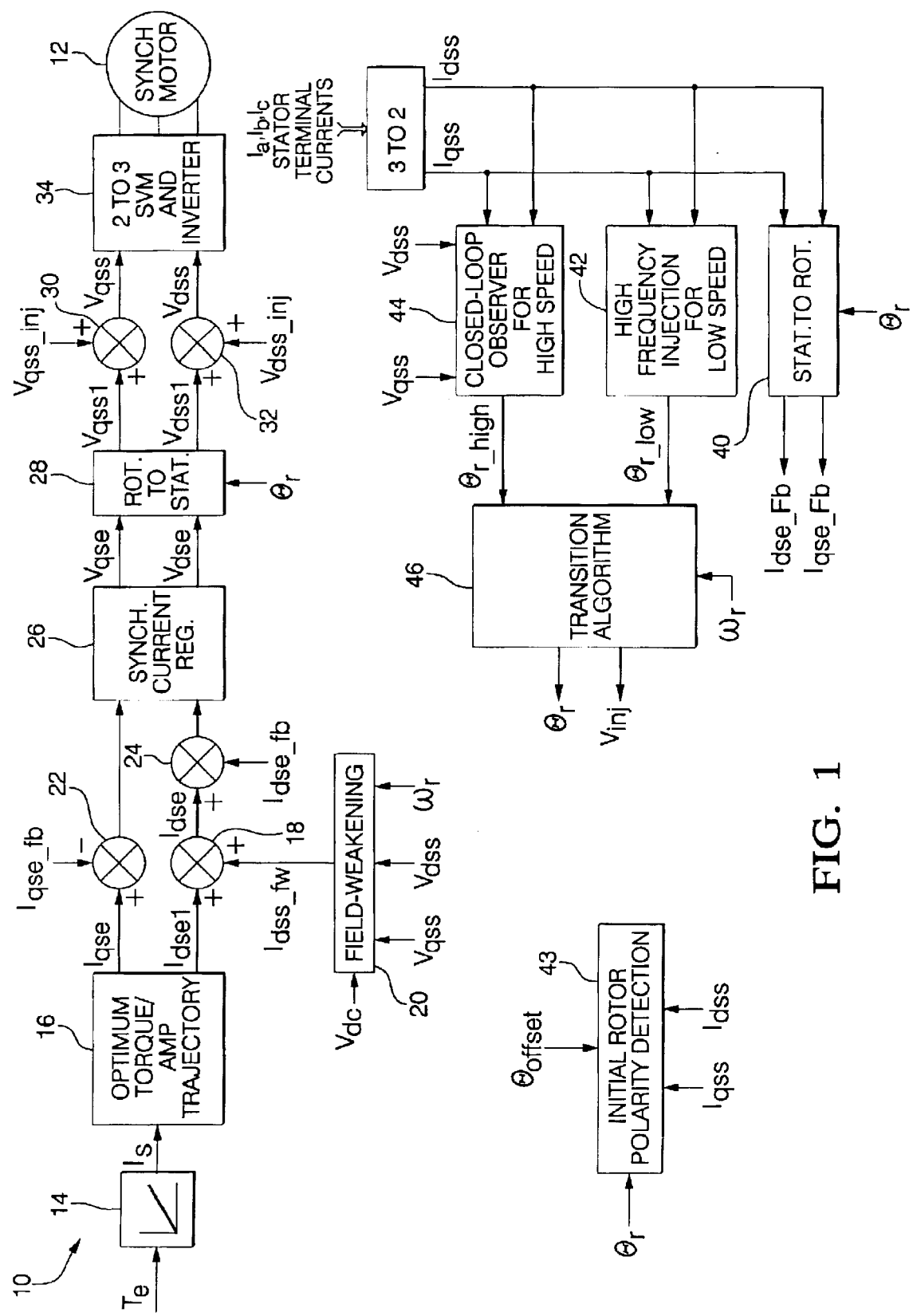
FIG. 1 is a block diagram of a control system in the present invention.

FIG. 1 is a diagrammatic drawing of a preferred embodiment of a control system 10 of the present invention. The control system 10 is illustrated as a sequence of block diagrams that represent software executed in a controller, microprocessor, or similar device to control an electric motor 12. In the preferred embodiment of the present invention, the controller is a vehicle powertrain controller controlling the electric motor 12, but any other motor control application is considered within the scope of the present invention. The electric motor may comprise motor technologies such as synchronous reluctance motors, induction motors and interior permanent magnet motors. The input to the control system is a torque command $T_e$ generated by the vehicle controller. The torque command $T_e$ is processed by a torque linearization model 14 to generate a corresponding stator current $I_s$ required to develop the desired electromagnetic torque in the motor 12. The stator current generated at bock 14 is then passed to an optimum torque per amp block 16. Block 16 processes the commanded stator current and decomposes it into the respective D and Q axis components of current command ($I_{dse1}$ and $I_{qse}$) to provide the maximum torque for the given stator current amplitude.

The current command $I_{dse1}$ is added to a field weakening component $I_{dse\_fw}$ generated at summing junction 18 to generate the final D axis current command $I_{dse}$. The field weakening component $I_{dse\_fw}$ is generated by a field weakening block 20 using the measured DC link voltage $V_{de}$, commanded output voltages $V_{qss}$ and $V_{dss}$, and rotor angular velocity $\omega_r$. Summing junction 22 subtracts the feedback current $I_{qse\_fb}$ from the Q axis current command $I_{qse}$ to obtain the error of the Q axis current regulator. Summing junction 24 subtracts the feedback current from $I_{dse\_fb}$ from the D axis current command $I_{dse}$ to obtain the error of the D axis current regulator. The errors generated by the summing junctions 22 and 24 are used by a synchronous current regulator block 26 to control the synchronous frame voltage commands $V_{dse}$ and $V_{qse}$.

Block 28 uses the estimated rotor angular position $\theta_r$ to convert the synchronous frame voltage commands $V_{dse}$ and $V_{qse}$ to the stationary frame voltage commands $V_{dss1}$ and $V_{qss1}$. The high frequency voltage signals $V_{dss\_inj}$ and $V_{qss\_inj}$ are added to the stationary reference frame voltage commands by the summing junctions 30 and 32, resulting in the final voltage commands $V_{dss}$ and $V_{qss}$. The voltage source inverter 34 processes the final voltage commands $V_{dss}$ and $V_{qss}$ to generate the actual phase voltages applied the motor 12. The phase currents $I_a$, $I_b$, and $I_c$ are measured and processed by a three-phase to two-phase transformation block 36 (in practice, only two phase currents need be measured if the motor neutral is floating). The outputs of the block 36 are stationary frame currents $I_{dss}$ and $I_{qss}$. A stationary to rotating frame transformation block 40 uses the stationary frame currents $I_{dss}$ and $I_{qss}$ and the estimated rotor angular position $\theta_r$ to generate synchronous reference frame feedback currents $I_{dse\_fb}$ and $I_{qse\_fb}$.

The present invention includes sensorless control of the rotor speed and position that includes: a low speed rotor angular position estimation method/observer at block 42; an initial rotor polarity detection method at block 43; a high speed rotor angular position estimation method/observer at block 44; and a transition algorithm at block 46 to seamlessly merge the low and high speed estimation methods.

Figure 2:
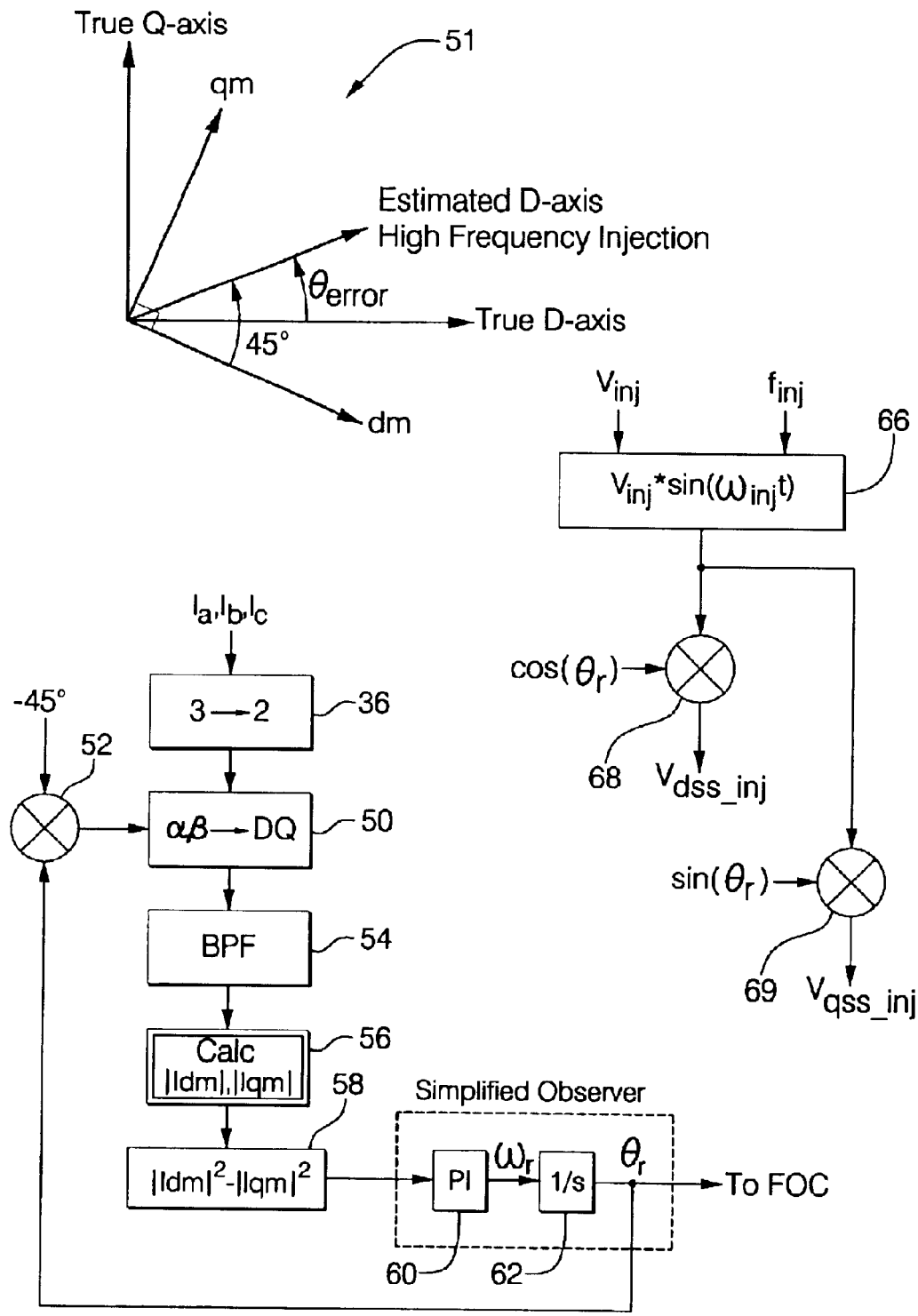
FIG. 2 is a block diagram of the low speed rotor electrical speed/position estimation method of the present invention.

Block 42 of FIG. 1 represents the low speed estimation method of the present invention. FIG. 2 shows a detailed block diagram implementation of block 42 to estimate rotor electrical position during low-speed operations as described above. The low speed estimation method is used to estimate rotor electrical position during zero and low-speed operations (preferably <10% of rated machine speed but any machine speed is considered within the scope of the low speed estimation method of the present invention). The estimation of the rotor electrical position is performed by injecting a high frequency voltage signal on an estimated D axis of the machine as shown by plot 51. The fluctuating high frequency signal in a synchronously rotating reference frame with the fundamental stator frequency is used to detect an asymmetry of the spatial impedance in an AC machine. The present invention senses the magnitude of the high frequency currents in two orthogonal test axes $I_{dm}$ and $I_{qm}$ which can be manipulated to determine the minimum (or maximum, depending on machine type) spatial impedance point of the machine, corresponding to the D-axis.

Referring to FIG. 2, the three-phase current components $I_a$, $I_b$, and $I_c$ are converted to a two-phase coordinate system in a stationary frame by block 36. Block 50 transforms the stationary frame currents to a synchronously rotating measurement frame with an angular input from summing junction 52. The input from summing junction 52 is equal to the estimated rotor angular position minus 45 degrees. In alternate embodiments of the present invention, other measurement frames may be used.

A bandpass filter block 54 removes all but injection frequency components, eliminating fundamental, switching, and other unwanted frequency components. The magnitude of the $I_{dm}$ and $I_{qm}$ components are calculated in block 56 and will be discussed in more detail with reference to FIG. 3. Block 58 calculates the error function using the formula $|I_{dm}|^2 - |I_{qm}|^2$. It can be shown that the error function returns a value proportional to the angular error between the real and estimated D-axis. The error term is used by the proportional-integral (PI) block 60 in order to produce a output control signal which will reduce the position estimate error to zero (align the estimated rotor angular position to the real D-axis of the machine). The output of PI control block 60 is the estimated angular velocity of the machine and is integrated with respect to time at block 62 to generate a position estimate input to the summing junction 52 and vector control transformation blocks 28 and 40. The control block 60 need not be limited to a simple PI, but may be a higher order observer as well.

Block 66 shown in FIG. 2 computes the high frequency voltage to be injected on the estimated D-axis. $V_{inj}$ is the magnitude of the injected signal and $f_{inj}$ is the frequency of the injected signal. Multipliers 68 and 69 perform a synchronous to stationary frame transformation on the injection signal to generate the stationary frame signals $V_{dss\_inj}$ and $V_{qss\_inj}$. These signals are added to the stationary frame voltage commands by summing junctions 30 and 32.

Figure 3:
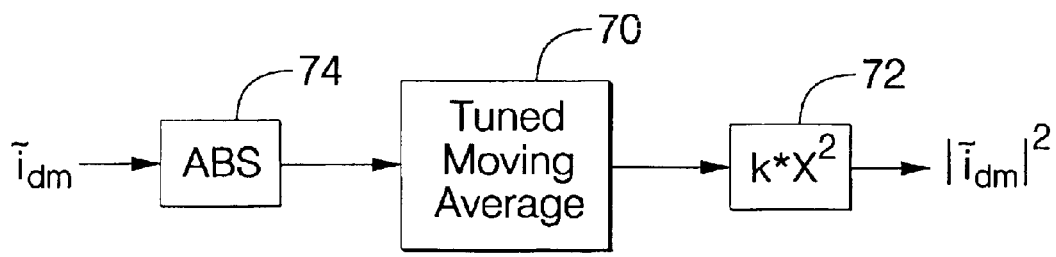
FIG. 3 is a block diagram of the current calculation method of the present invention.

FIG. 3 is a more detailed version of block 56 in FIG. 2 and illustrates the moving average method of the present invention. Block 74 is the absolute value function which essentially rectifies the incoming sinewave, block 70 is a tuned moving average filter used to extract the magnitude information from the rectified sinewave, and block 72 is a square function with gain factor k used to compute the output signal $|I_{dm}|^2$ which can be used in block 58 to compute the error function. In alternate embodiments, $I_{dm}$ and $I_{qm}$ may be used singly or in combination to compute the output signal of block 56.

To explain the signal processing, consider the measured signal on the $d_m$ axis, $I_{dm}$. The signal of concern is a sine wave at the injection frequency $f_{inj}$, with magnitude $I_{pk}$.

$$I_{dm} = I_{pk} \sin(2\pi f_{inj} t)$$

$$|I_{dm}| = I_{pk}$$

The signal is first rectified by the absolute value function of block 74. If the original sine has a frequency $f_{inj}$, then the Fourier series of the rectified signal is:

$$\text{abs}(I_{dm}) = I_{avg} + \sum_{n}^{\infty} I_{n-pk} \sin(2\pi f_n t)$$

where:

$$I_{avg} = \frac{2 I_{pk}}{\pi}$$

$$I_{n-pk} = \frac{2 I_{pk}}{\pi} \left( \frac{-2}{n^2 - 1} \right)$$

$$f_n = n * f_o$$

$$n = 2, 4, 6 \ldots$$

$I_{avg}$ is defined as the average (DC) value of the rectified sinewave, $I_{pk}$ represents the peak value or magnitude of the input waveform $I_{dm}$, and n is the harmonic number.

Accordingly, the rectified signal is composed of a DC component and even harmonics. To measure the $|I_{dm}|$, the DC component is first extracted by eliminating the harmonics. An appropriately designed moving average filter 70 shown in block 56 of FIG. 3 can provide a response that is relatively fast and has zero ripple on the resultant magnitude measurement of $I_{dm}$. The moving average filter 70 is defined as:

$$Y(z) = \frac{1}{N}(1 + z^{-1} + z^{-2} + \ldots + z^{-(N-1)}) X(z)$$

The moving average filter has evenly spaced spectral nulls or zeros. The zeros of the filter can be placed with respect to the sample frequency by selecting the number of weights N as follows:

$$f_{z-k} = k \frac{f_s}{N}$$

$$k = 1, 2, 3 \ldots$$

If the zeros of the moving average filter are placed exactly at the known harmonics of the rectified signal, only the DC component will pass through the filter 70. The filtered output will have zero ripple. The number of weights are chosen so as to place the zeros at the known harmonics of the rectified signal. The first zero should be placed at the second harmonic of the injection frequency:

$$f_{z-1} = \frac{f_s}{N} = 2 f_{inj}$$

$$N = \frac{f_s}{2 f_{inj}}$$

Choosing a low number of weights minimizes the group delay (time delay of filter). The moving average is a FIR or linear phase filter, and has a constant group delay, as shown by the following equation:

$$T_{GroupDelay} = \frac{NT_s}{2}$$

Once the average value is extracted, the desired magnitude is computed as follows:

$$I_{pk} = \frac{\pi I_{avg}}{2}$$
$$|I_{dm}| = I_{pk}$$

For an application example for the present invention, consider the following case:

$f_{inj}$=500 Hz $f_s$=10 kHz

The rectified signal will have harmonics at 1 kHz, 2 kHz, etc. A moving average filter with N=10 will have zeros at 1 kHz, 2 kHz, etc., providing the desired filter characteristics. Group delay is 500 μseconds, while the phase delay at 50 Hz is 9 degrees.

Figure 4:
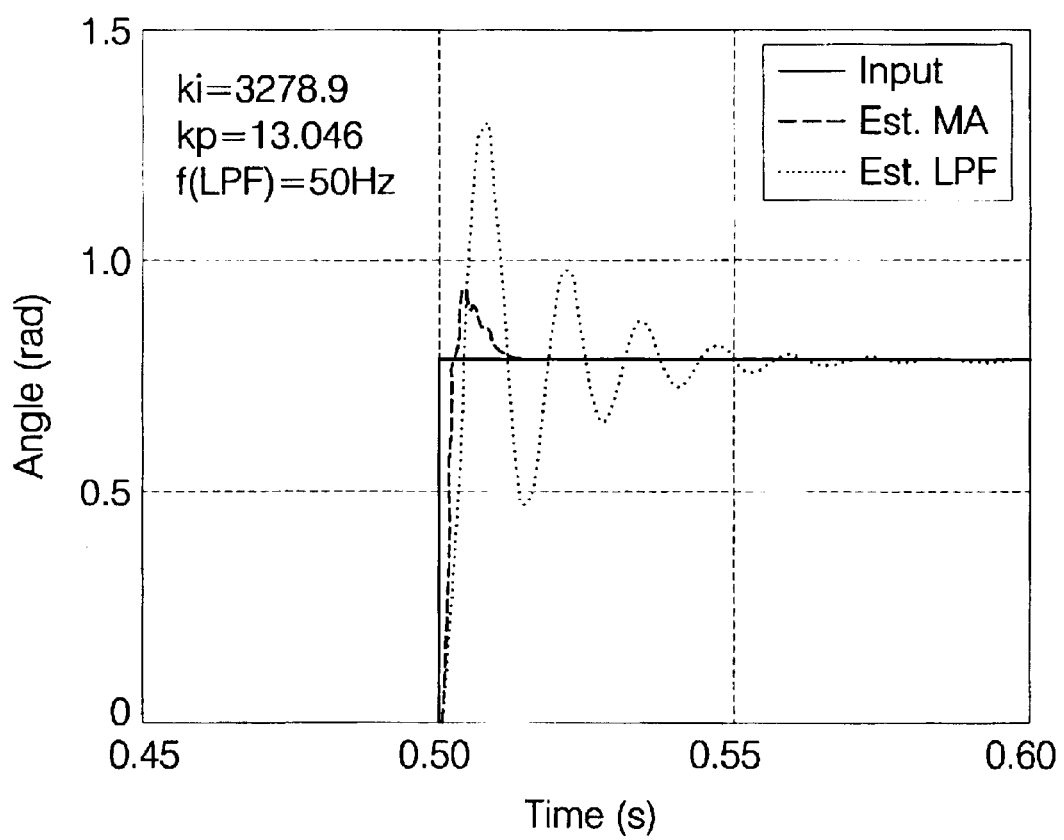
FIG. 4 is a plot of the transient response of the present invention in response to a step function.

The present invention will reduce execution time for a sensorless feedback system and still allow relatively high bandwidth and good transient response of the sensorless control system. FIG. 4 illustrates a simulation of the rotor flux position observer due to step input of the rotor flux angle. The observer provides fast transient response with no ringing and small overshoot.

It is to be understood that the invention is not limited to the exact construction illustrated and described above, but that various changes and modifications may be made without departing from the spirit and scope of the invention as defined in the following claims.

What is claimed is:

1. A control system for an electric motor comprising:
an inverter for providing power to the electric motor;
a controller for controlling said inverter;
a first motor speed control block in said controller injecting a high frequency signal into said electric motor to determine the speed and position of the electric motor; and
wherein said first motor speed control block includes a tuned moving average filter to determine the magnitude of high frequency current in the electric motor.

2. The control system of claim 1 wherein said electric motor is an induction motor.

3. The control system of claim 1 wherein said electric motor is an interior permanent magnet motor.

4. The control system of claim 1 wherein said first motor speed control block uses a bandpass filter to isolate said high frequency signal.

5. The control system of claim 1 wherein said electric motor is a three-phase motor.

6. The control system of claim 1 wherein said injected high frequency signal is in the range of substantially 300 to 1000 Hz.

7. The control system of claim 1 wherein said first motor control speed block operates when the electric motor is below ten percent of rated machine speed.

8. The control system of claim 1 wherein said tuned moving average filter has evenly spaced spectral nulls.

9. A method of controlling an electric motor comprising:
injecting a high frequency signal into said electric motor; and
processing feedback generated by the injected high frequency using a tuned moving average filter to determine the position of a rotor in the electric motor.

10. The method of claim 9 further comprising the step of selecting evenly spaced spectral nulls for the tuned moving average filter.

11. The method of claim 9 further comprising the step of filtering the current of the electric motor with a bandpass filter to isolate a high frequency current.

12. A powertrain for a vehicle comprising:
an electric motor functionally coupled to at least one wheel in the vehicle;
an inverter electrically coupled to said electric motor;
a DC voltage source electrically coupled to said inverter;
a controller for controlling the output of said inverter to provide electrical current to said electric motor;
a first motor control module in said controller injecting a high frequency signal into said electric motor to determine the speed and position of the electric motor; and
wherein said first motor control module includes a tuned moving average filter to determine the magnitude of high frequency current in the electric motor.

13. The powertrain of claim 12 wherein said electric motor is an induction motor.

14. The powertrain of claim 12 wherein said electric motor is an interior permanent magnet motor.

15. The powertrain of claim 12 wherein said electric motor is a synchronous reluctance motor.

16. The powertrain of claim 12 wherein said electric motor is a three-phase motor.

17. The powertrain of claim 12 wherein the electric motor includes an interior permanent magnet rotor.

18. The powertrain of claim 12 further comprising a initial rotor polarity detection module in said controller to determine the polarity of said interior permanent magnet rotor of the electric motor.

* * * * *